US007103846B1

(12) United States Patent
Shafrir et al.

(10) Patent No.: US 7,103,846 B1
(45) Date of Patent: Sep. 5, 2006

(54) COLLABORATIVE APPLICATION WITH INDICATOR OF CONCURRENT USERS

(75) Inventors: Avner Shafrir, Rehovot (IL); Jacob Rimer, Rehovot (IL); Haim Schneider, Ramot Meir (IL); Michael A. Dempsey, Arlington, MA (US); Paul Haverstock, Acton, MA (US); Avshalom Houri, Netivot (IL)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 09/583,734

(22) Filed: May 31, 2000

Related U.S. Application Data

(60) Provisional application No. 60/137,513, filed on Jun. 2, 1999.

(51) Int. Cl.
*G06F 17/00* (2006.01)
*G06F 15/16* (2006.01)

(52) U.S. Cl. ............... 715/751; 715/753; 715/758; 709/201; 709/204; 709/227

(58) Field of Classification Search ............ 345/733, 345/738, 739, 750, 751, 752, 753, 754–759; 715/751–753, 758–759, 760–764; 709/200–205, 709/207, 217, 229, 228, 230, 248, 249
See application file for complete search history.

(56) References Cited

U.S. PATENT DOCUMENTS

| 5,388,196 | A | | 2/1995 | Pajak et al. |
| 5,511,187 | A | | 4/1996 | Cragun |
| 5,793,365 | A | * | 8/1998 | Tang et al. ............... 345/758 |
| 5,819,084 | A | | 10/1998 | Shapiro et al. ............ 707/10 |

(Continued)

OTHER PUBLICATIONS

"Communicate Online With Your Site Visitors". http://web.archive.org/web/19990203190928/www.icq.com/commpanel/ ICQ, Inc. web page. Feb. 12, 1998.*

(Continued)

*Primary Examiner*—Tadesse Hailu
*Assistant Examiner*—Larry O. Anderson
(74) *Attorney, Agent, or Firm*—Pillsbury Winthrop Shaw Pittman, LLP

(57) ABSTRACT

A system, method, and processor readable medium containing processor readable program code embodied therein are provided that enable network users to view one or more network user's status and to establish communications with the one or more network users using a user indicator in an electronic document (e.g., electronic mail message, hypertext markup language document). The user indicator may be a network user's login identification presented as a hypertext link to one or more communication options. The system may include an identification module for identifying the one or more network users. The identification module may identify a network user's login identification (e.g., the network user's name, employee number) and provide the network user's status using the user indicator. A status module, responsive to the identification module, provides the status of the network users. The status module may provide a visual indication of a network user's status using, for example, color coding, formatting, symbols, etc. A communication module for establishing a communication link with the one or more network users using the user indicator may also be provided. The communication module may be used to establish a variety of communications with one or more of the network users. For example, a user may chat, telephone, transmit an electronic mail message, share one or more application programs, whiteboard presentations, facsimile, or page to one or more of the network users by selecting the user indicator using a conventional computer mouse or keyboard.

23 Claims, 10 Drawing Sheets

U.S. PATENT DOCUMENTS

| | | | | |
|---|---|---|---|---|
| 5,864,874 | A | | 1/1999 | Shapiro ..................... 707/201 |
| 5,960,173 | A | * | 9/1999 | Tang et al. ................. 709/201 |
| 5,970,468 | A | * | 10/1999 | Bull ............................. 705/1 |
| 6,020,884 | A | | 2/2000 | MacNaughton et al. |
| 6,050,898 | A | | 4/2000 | Vange et al. |
| 6,078,929 | A | | 6/2000 | Rao |
| 6,119,147 | A | | 9/2000 | Toomey et al. |
| 6,243,714 | B1 | | 6/2001 | Shapiro et al. ............. 707/201 |
| 6,363,352 | B1 | * | 3/2002 | Dailey et al. .................. 705/9 |
| 6,393,460 | B1 | * | 5/2002 | Gruen et al. ................ 709/204 |
| 6,449,344 | B1 | | 9/2002 | Goldfinger et al. ...... 379/88.17 |
| 6,484,196 | B1 | | 11/2002 | Maurille ..................... 709/206 |
| 6,507,845 | B1 | * | 1/2003 | Cohen et al. ................ 707/100 |
| 2005/0055306 | A1 | * | 3/2005 | Miller et al. .................. 705/37 |

OTHER PUBLICATIONS

"The ICQ Status Indicator". http://web.archive.org/web/19991125224052/www.icq.com/features/web/indicator.html ICQ, Inc. web page. May 2, 1999.*

Evans, Joel. "ICQ Has Features Consultants Need—And It's Free". May/Jun. 1998. Contract Professional Archives. http://www.cpuniverse.com/newsite/archives/1998/mayjun/tool.html.*

"How to Use ICQ". http://web.archive.org/web/19980212181102/www.icq.com/icqtour/fulltour.html ICQ, Inc. web page. Feb. 12, 1998.*

"Sausage Software and Mirabilis team up to bring ICQ to Hotdog users" http://www.icq.com/press/press_release25.html Jan. 5, 1998.*

"What's New" http://web.archive.org/web/19980224015143/www.icq.com/products.html. 1998.*

Chatting in Style, University of North Carolina at Chapel Hill, School of Information and Library Science, Fall 1998.*

Mirabilis LTC.-Quick Tour, How to Use ICQ, Feb. 12, 1998.*

ICQ Inc, ICQ Email Signature, Create Your ICQ E-mail Signature, May 2, 1999.*

ICQ Inc, ICQ E-mail Integration, May 8, 1999.*

* cited by examiner

COLLABORATIVE APPLICATION WITH INDICATOR OF CONCURRENT USERS

This application claims priority based on U.S. Provisional Patent Application Ser. No. 60/137,513, filed Jun. 2, 1999, entitled "System and Method for Enabling a User to Obtain a User Status and Establish a Communication Link Using the User Status." This application is also related to co-pending U.S. patent application entitled "Visual Indicator of Network User Status Based on User Indicator," Ser. No. 09/580,904, filed May 31, 2000 and U.S. patent application entitled "Communication Link System Based on User Indicator," Ser. No. 09/583,736, filed May 31, 2000.

FIELD OF THE INVENTION

The invention relates to a system and method for presenting a user status indicator for network users on the system and establish communications with network users through the user status indicator.

BACKGROUND OF THE INVENTION

Systems for determining whether a network user is on-line are known. Such systems typically enable users to view criteria relating to one or more user's on-line status. This criteria may include, for example, the time and terminal at which a user logged-on to the network. Prior systems, however, generally require a separate computer application program to obtain information regarding user status. For example, users may need to open a network application program that provides a network user's status information.

Network application programs typically require users to know a user's login identification to obtain a user's status. A user's login identification may be, for example, the user's name, a number associated with the user's name, or a variation of one or both. If a user does not know a user's login identification, the user may not be able to obtain that user's status.

Additionally, provided a user is able to obtain a user status for one or more users, existing systems typically do not enable the user to perform any other operations based on the user's status. A user again must use a separate computer program to perform another desired operation. This type of configuration increases the time required to obtain a user's status and does not provide a user with additional capabilities relating to the user's status.

These and other drawbacks exist.

SUMMARY OF THE INVENTION

An object of the present invention is to overcome these and other drawbacks in existing systems.

Another object of the present invention is to provide a system and method that present a network user's status in an electronic document using a user indicator and enable a user to establish a communication with that network user using the user indicator.

Another object of the present invention is to provide a system and method that present visual coding of a network user's status with the presentation of a user indicator associated with the network user.

Another object of the present invention is to provide a system and method that present a selectable portion in a graphical user interface (GUI) that may be selected by a user to present the status of network users, including the status of network users whose user indicator is presented in a markup language (e.g., hypertext markup language) document, electronic mail message (e-mail) or other electronic document presented in the GUI.

Another object of the present invention is to provide a system and method that present a network user's user indicator as a link that may be selected to establish a communication with that user.

Another object of the invention is to provide a system and method that enable a network user to establish a communication with one or more network users using the link.

Another object of the present invention is to provide a system and method that present a network user's user indicator as a link based on the user's status.

In the present invention, the concept of a user indicator should be understood to include the name of a user, the user's login identification, a user numeric identifier or other login identification. According to an embodiment of the present invention, the system presents user indicators within electronic documents along with a status indicator. Status indicators may comprise a communications link, color, font, icon, word(s) or other indicator that informs document viewers of the status of the user associated with the user indicator. For example, if a user's name is Joe Smith, whenever Joe Smith's name appears in any electronic document (e.g., e-mail), that name may be presented as a link (e.g., with underlining and highlighting as in a hypertext markup language (HTML) document link) if Joe is on-line and actively using the system. A viewer of the e-mail may then select the link to activate communication systems that allow the viewer to communicate with Joe Smith.

User status may comprise two types of status: the on-line status of the user and the availability status of the user. The on-line status may indicate whether the user is on-line for a particular communication mode. For example, in a networked environment for which users log-in before gaining access to a server system, the on-line status may represent whether the particular user is logged-in. If the communication mode is a pager, cellular phone, or some other communications system, the on-line status may indicate whether the user's device is on.

The availability status may represent whether the user is available for communication through the communication mode. For the networked environment example, the availability status may indicate whether the logged-in user is actively using the network, in a do-not-disturb mode, or not actively using the network. Other choices may also be provided. For other communications modes, for example, the availability status may indicate whether the user is actively using the communications device.

Different visual indicators may be provided for the on-line and availability status indicators. For example, in one embodiment, the system presents the user indicator for a network user as an active link if the user is on-line and provides a colored "active" icon if the user is also available and active on the system. The link may then be activated to present one or more communications options for the viewer to communicate with the on-line user. The communications options may be presented according to user-defined preferences through visually indicating the user's preferences.

Also, different visual indicators may be provided with the user indicator, each visual indicator associated with a different user communication device. Therefore, a user may view with the user indicator the on-line and availability status of communicating with a particular user over a plurality of different communication mediums, including chat, e-mail, telephone, audio-visual, pager, application sharing, whiteboard presentations, mobile phone and many others.

To accomplish these and other objects and features, a system, method, and processor readable medium containing processor readable program code embodied therein are provided according to an embodiment of the present invention. This system presents user indicators that may be selected, like a link, to communicate with the user corresponding to the user indicator.

The system provides an identification module for identifying the one or more network users through the user indicator. The user indicator may comprise the user's name, employee number, log-in identification or other such indicator. The identification module may also cooperate with a status module to present the status of the user corresponding to the user indicator. The status module may provide a visual indication of a network user's status using, for example, color coding, formatting, symbols, etc. A communication module is provided that, upon activation, establishes one or more communications with the selected network users, such as through selection of the user indicators. Communications may include chat, telephone, e-mail, facsimile, application sharing, whiteboard presentations or paging that may be initiated by the user selecting the user indicator like a link in a HTML document.

These and other objects, features, and advantages of the invention will be apparent to those having ordinary skill in the pertinent art from the detailed description of the preferred embodiments with reference to the figures.

DETAILED DESCRIPTION OF THE PREFERRED EMBODIMENTS

The present invention enables users to determine, by visual inspection, whether other network users are available for communication using a user indicator. The invention enables users to determine a network user's status wherever a user indicator is presented in the system, whether it is in an e-mail, HTML, document, or any other electronic document. The system presents each user indicator with a status link (e.g., visual indication) for one or more network users identified in an electronic document. A network user's status may include the user's on-line status and availability status for communication with one or more communications media, although other status identifiers may also be provided.

A network user's status may be displayed using a variety of coding techniques. Each coding technique may signify a different status. For example, a user indicator may be displayed in a particular color (e.g., green) if a network user is logged in to the network and actively using the network. Also, a symbol (e.g., a red square) may be displayed adjacent a user indicator to signify that the network user is logged in to the network but not actively using the network. Other coding techniques may also be used.

According to one embodiment of the present invention, the invention provides a pervasive system 10 for providing a status link to one or more communication operations using a user indicator identified in an electronic document. System 10 is pervasive by enabling user indicators appearing in any electronic document to be used as a link to other operations.

According to another embodiment of the invention, a network user may establish communications with one or more network users using the user indicator. A network user may request that a communication link (e.g., an audiovisual call, e-mail, chat, application sharing, whiteboard presentations, etc.) be established with a network user that is logged in to and available on that type of communication by, for example, using a conventional computer mouse to "click" on the status link and be provided with one or more communication options. The network user may then select, for example, an option entitled, "Audiovisual call," and establish an audiovisual communication link with one or more network users. Alternatively, the invention may present a network user with various icons representing particular communication modes. The network user may then select a particular icon and establish a communication using the communication mode represented by the icon selected. These and other embodiments of the present invention are described in further detail below.

Figure 1:
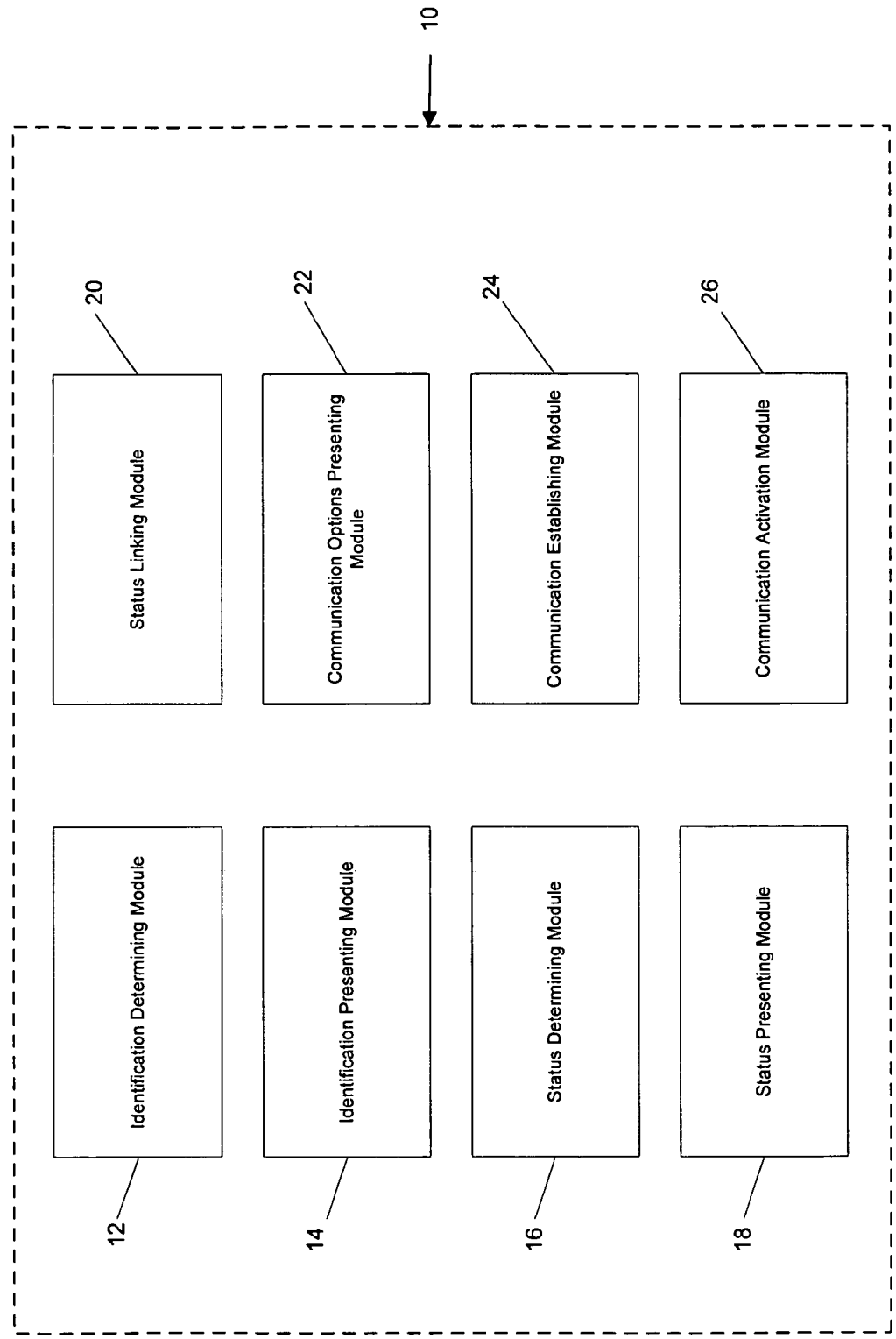
FIG. 1 is a schematic block diagram of components of a communication system in accordance with one embodiment of the present invention.

FIG. 1 illustrates a system 10 for enabling a network user to obtain one or more network users' status and establish a communication with one or more network users. System 10 may include one or more modules including an identification determining module 12, identification presenting module 14, status determining module 16, status presenting module 18, status linking module 20, communication options presenting module 22, communication establishing module 24, and communication activation module 26. Identification determining module 12 may be used to determine a user indicator that is to be linked. A user indicator may be, for example, the network user's name, an employee identification number, a combination of the two, or various other forms. Once a user indicator is determined, identification presenting module 14 may be used to present the user indicator within an electronic document within the system, such as an electronic mail document, a HTML document, a window box, or some other viewable document presented to a user.

When presenting a user indicator, status determining module 16 may be used to determine a network user's status (e.g., on-line and active, on-line and inactive, etc.) so that status presenting module 18 may present a visual indication of a network user's status using the user indicator. For example, status determining module 16 may determine that a network user is logged in to the network (e.g., on-line) and actively using the system (e.g., typing, moving a computer mouse, etc.). Based on this determination, status presenting module 18 may present the user indicator using one or more formatting options. For example, a user indicator of a network user who is on-line and actively using the network may appear as green text. Also, a symbol associated with an on-line/active status may be displayed adjacent a user indicator to indicate the network user's status. For example, a green square with the word "active" may be placed adjacent a user indicator of a network user that is on-line and actively using the network.

Status linking module 20 may cooperate with status presenting module 18 to provide a communication link using a user indicator. For example, a network user may select a user indicator listed in an electronic document (e.g., using a conventional computer mouse or keyboard). Status linking module 20 may allow two modes of selecting communication options. One mode may automatically select a default or most preferred option and another mode may be used to present a user with available communications options. For example, if a user "clicks" a left button on a conventional computer mouse, status linking module may initiate, for example, a text chat if text chat is the default or first available user preferred communication. After a user indicator is selected, communication options presenting module 22 may be used to present one or more communication options to the network user. Communication options may include, but are not limited to, audiovisual call, telephone calling, application sharing, whiteboard presentations, electronic mailing, faxing, paging, and chatting.

A network user may prioritize one or more communication options and the system may present the communication options to show the user's communications preferences. For example, the system may present communications options in an order reflecting a network user's communication preference. For example, a network user may prefer to receive communications via electronic mail. The network user may set a communication options preference so that communication options are presented to a network user in the following order: 1) electronic mail; 2) chat; 3) audiovisual call; 4) page; 5) facsimile. Thus, a network user attempting to contact this network user may realize that the network user prefers to receive communications via electronic mail.

Also, certain communications options may be presented in different colors, fonts, sizes, with visual numeric indicators, graying out, bold, or any other method of visually indicating different preferences from a group of options. It may also be desired that only available options are presented or that the first preferred method is shown if available, the second preferred method is shown if the first is not available, etc.

After a communication option is selected, communication establishing module 24 may be used to establish the communication selected using the user indicator. If a network user selects, for example, an audiovisual call, communication activation module 26 may be used to activate an audiovisual call with the selected user. Communication activation module 26 enables one or more network users to communicate using the selected communication option (e.g., audio, video, application sharing, chat). For example, network users that have established an audiovisual call may desire to view and modify an image and have the other network users, with whom the network user is communicating, view the changes as they are being made. The software package known as Sametime™ may be used for application sharing or whiteboard presentations. Communication activation module 26 also enables network users to share one or more applications without having a communication link established. Various other methods of application sharing may be performed using known application sharing programs.

Figure 1A:
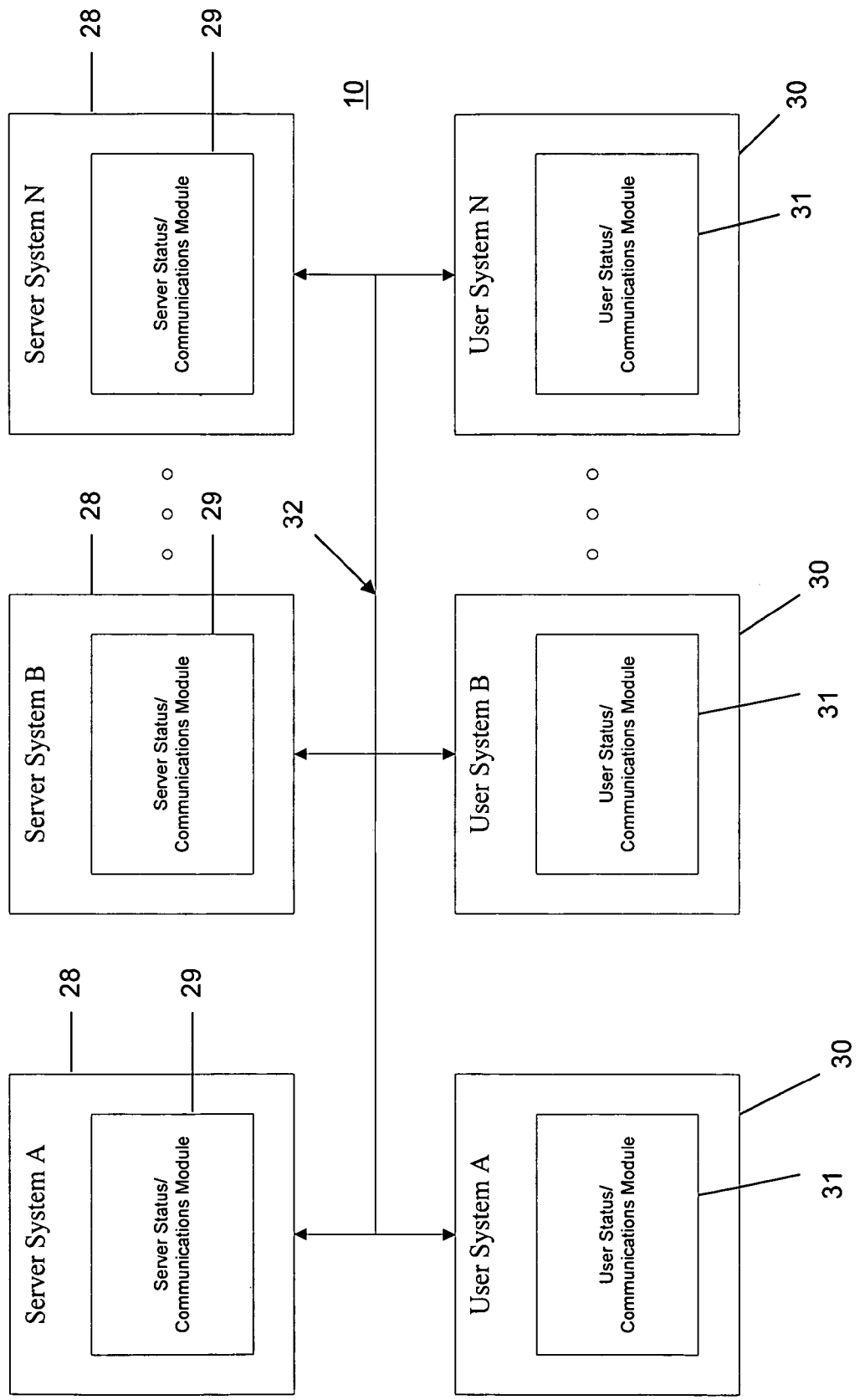
FIG. 1A is a schematic block diagram of a networked system according to an embodiment of the present invention.

FIG. 1A depicts an embodiment of a networked system according to an embodiment of the present invention. System 10 comprises a server systems 28 connected over a network 32 to one or more user systems 30. Network 32 may comprise any network including local area networks, wide area networks, intranets, the Internet or other network. User systems 30 may each comprise a user status/communications module 31 and server system 28 may comprise a server status/communications (SC) module 29. These modules may each comprise the modules of FIG. 1. Also, it is possible that server and user modules 29 and 31, respectively, comprise a subset of the modules of FIG. 1.

For example, server SC module 29 may comprise identification determining module 12, status determining module 16, status linking module 20, communication establishing module 24, and communication activation module 26. As such, server system 28 may receive updates from each of all user systems 30 of all users on the system (e.g., when a user status changes) which may therefore be reported out to each of the user systems 30. Accordingly, the status of all user systems may be known to all other user systems to enable the user SC module 31 to be able to present status information with the user indicators. User SC modules 31 may, for example, send status information (preferably in real time) for that user system whenever the status information for that user system changes. The information may be compiled by server SC module 29 and sent to user SC modules 31 (e.g., at login, when a user status changes). Other mechanisms for status updates of all users may also be used. For example, a system administrator or user may set a desired interval for performing status updates. Further, the status of users may be periodically checked by user SC modules 31 only when that information is desired for presenting with a user indicator.

As shown in FIG. 1A, server system 28 may be distributed. That is, server systems A–N may be in communication with each other. This enables-server systems 28 to communicate status notifications between two or more server systems 28. For example, user system A may be in communication with server system A and user system B may be in communication with server system B. Because server systems A and B are in communication with each other, this enables server systems A and B to send and receive status updates to each other regarding user systems A and B.

Server system 28 may also be a multi-server connection. In this embodiment, user system 30 may be in communication with more than one server system 28. Each server system 28 may provide information regarding different types of status information and communication methods. For example, user system A may be in communication with server system A that provides a user's status for particular modes of communication (e.g., chat, application sharing, whiteboard presentations) and server system B that provides a user's status for a different communication mode (e.g., telephone).

Figure 2:
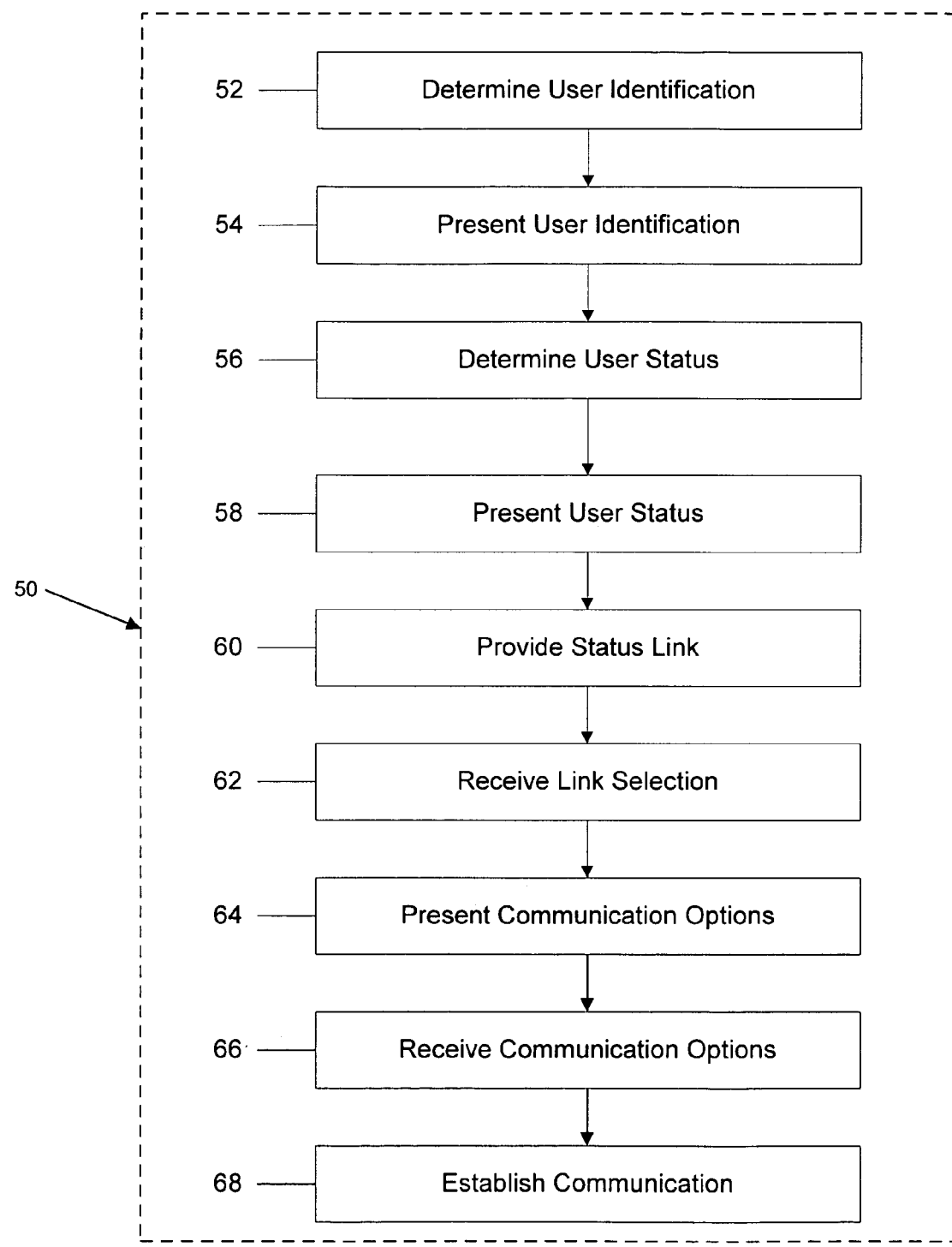
FIG. 2 is a schematic block diagram of a method of determining a user status and establishing a communication using the user status in accordance with one embodiment of the present invention.

FIG. 2 illustrates a method 50 for obtaining a network user's status and establishing a communication with one or more network users according to one embodiment of the invention. According to method 50, a user indicator is determined using step 52. A user indicator may be determined by examining a users directory that may be used to record login information regarding one or more network users. A server system may use a users directory to maintain records of all network users using the system. A users directory may be used to associate a network user with a user indicator. Therefore, system 10 may use a users directory to determine a user indicator. Other methods for determining user indicators may also be used.

After determining a user indicator, step 54 presents the user indicator as a user indicator in one or more electronic documents to one or more network users. Step 56 determines a network user's status (e.g., on-line and active) and presents the status using the user indicator in step 58. Step 56 may be performed through a common server system 28 as described above, for example. Step 60 may be used to provide a status link from the user indicator to one or more communication options. If a user selects a status link, the selection may be received using step 62. The communication options may then be presented to one or more network users in step 64. A user may select one or more communication options that are received by the system in step 66. Step 68 may then establish the communication(s) selected by the network user.

Various graphical user interface mechanisms and techniques may be used to present status information that may then be linked to communications with the user. In an embodiment, the presentation of a user name within an electronic mail may also include an indication of status and upon selection of the name, the ability to communicate with an on-line user through the communication device. An example is depicted below.

Figure 3:
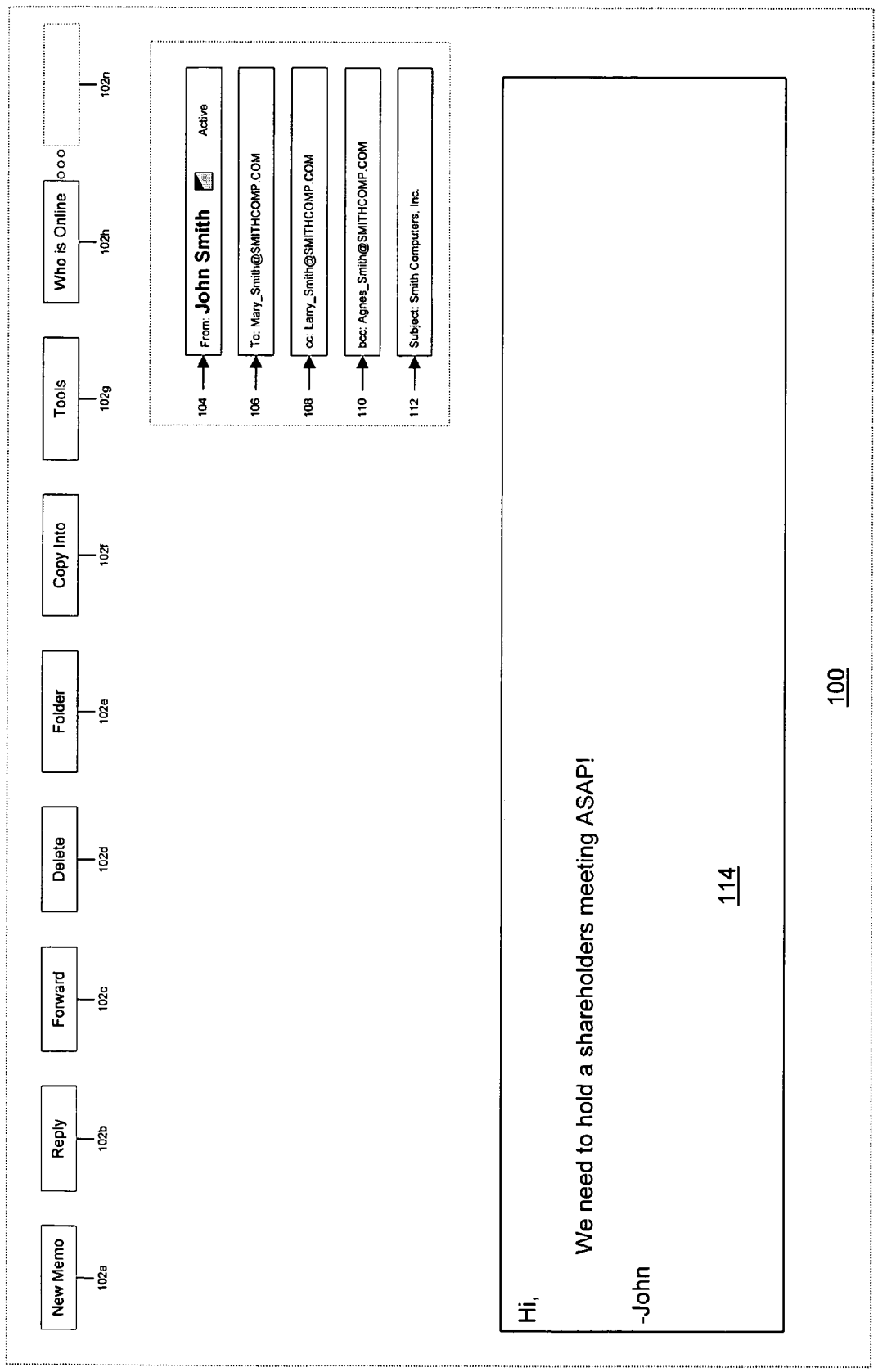
FIG. 3 is a schematic block diagram of a view of an electronic mail message in accordance with one embodiment of the present invention.

FIG. 3 illustrates a view 100 of an electronic mail message in accordance with an embodiment of the present invention. View 100 may comprise an action bar 102 (including action buttons 102a–102n), "From" field 104, "To" field 106, "cc:" field 108, "bcc:" field 110, "Subject" field 112, and message body 114. In any field in the message, names of recipients and originators are depicted. For any such user on the system, the system may present status information associated therewith. For example, in from field 104, John Smith is shown in bold green to indicate that he is on-line and also, the "active" word and icon is depicted next to his name to indicate that he is "active."

The other users in the electronic mail are not bolded, thus indicating that they are not presently on line. Also, it may be desirable to only represent the status of the "from" originator. In any event, by selecting the name, the communications module may activate a communication interface to enable the view of this message to communicate with John Smith over one or more communications media.

In another embodiment, it may be desirable to provide a selectable button to present the status information for users in an electronic document, such as an electronic mail message. Accordingly, the graphical user interface may present a plurality of action buttons 102a–102n (n representing any number of action buttons being available). These buttons may comprise selectable initiators to activate an executable action in the system and may include visual and/or textual representations of the actions associated therewith. For example, action buttons 102a–102f represent actions that may be performed regarding a message (i.e., create a new memo, reply, forward, delete, move, copy). Action button 102g may be a "Tools" icon that enables users to perform other types of actions regarding a message (e.g., scan a message for viruses). Action button 102h may be a "Who Is Online" button that enables users to be presented with, for example, an additional window listing the status and availability of all network users identified in the message. The network users may be identified, for example, in the "From," "To," "cc:," "bcc:," and "Subject" fields 104–112, respectively, or in message body 114.

"Who Is Online" button 102h provides a network user with a visual indication of which network users identified in view 100 are on-line and whether the network user is actively using the network. For example, after a network user selects "Who Is Online" button 102h, the network user may be presented with a separate "window" (shown in FIG. 4) listing the user indicators of the network users identified in the electronic document that are on-line and indicating whether the on-line network users are actively using the network. Identifying whether network users are on-line and actively using the network may be performed in a variety of ways. For example, the listing may include only those network users that are on-line. If one or more network users are on-line, their status may be indicated using a variety of techniques. For example, user indicators may appear in green text to indicate that the network user is actively using the network, red text to indicate that the network user is not actively using the network or other formatting manners (e.g., bold, underline, italics, highlighting).

According to another embodiment of the present invention, after a network user selects "Who Is Online" button 102h, the user indicators appearing in view 100 may be coded according to a particular criteria that signifies a user's status. For example, a user indicator of a network user that is actively using the network may be presented as green text directly in the field where the user indicator is presented (e.g., fields 104–112, message body 114). If a network user is not on-line, that user indicator may remain unchanged or be "grayed out," indicating that the network user is not on-line.

Figure 4:
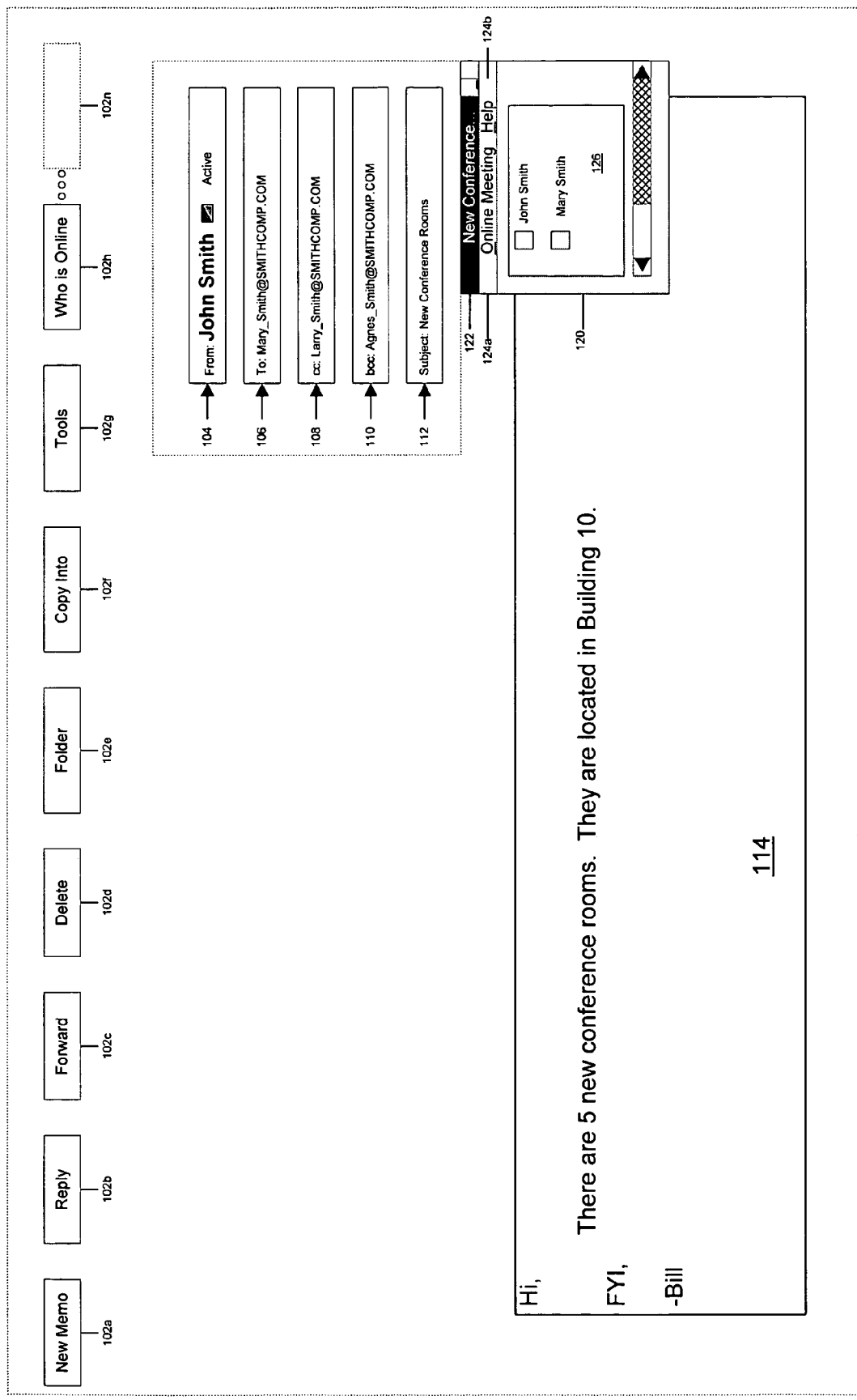
FIG. 4 is a schematic block diagram of a view of an electronic mail message illustrating various user's status in accordance with one embodiment of the present invention.

Upon activation of "Who Is On-Line" button 102h, a status window may be displayed. FIG. 4 illustrates a status window 120 according to an embodiment of the present invention. Status window 120 may comprise a title field 122, pull-down menus 124 (including pull-down menu options 124a and 124b), and identification field 126. Title field 122 may be used to identify the electronic document from which the user indicator(s) are based. Pull-down menus 124 may be used to enable a network user to perform various other operations regarding one or more network users (described in greater detail below). Identification field 126 may be used to list the user indicator(s) of the network user(s) that are on-line (and possibly not on-line) and indicate whether the on-line network users are actively using the network. Identifying whether one or more network users are actively using the network may performed in a manner similar to the coding used for user indicators in fields 104–112 and message body 114 of view 100 shown in FIG. 3.

Figure 5:
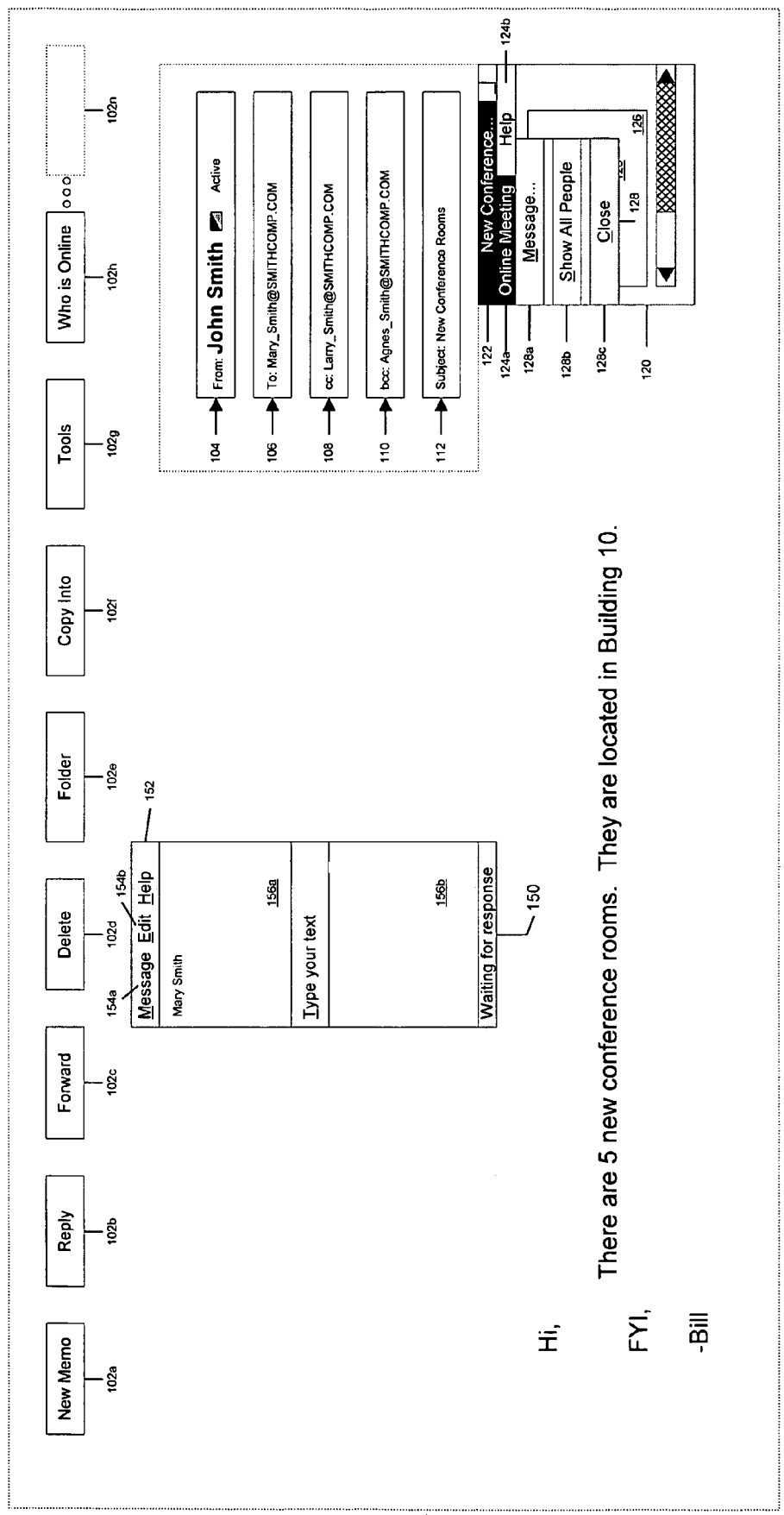
FIG. 5 is a schematic block diagram of a view of an electronic mail message illustrating network user's status in accordance with one embodiment of the present invention.

FIG. 5 illustrates an "Online Meeting" pull-down menu option 124a in accordance with one embodiment of the invention. "On-line Meeting" option 124a may include various options including "Message" option 128a, "Show All People" option 128b, and "Close" option 128c. "Message" option 128a may enable a network user to compose a message (e.g., a "chat" message) to one or more network users listed in status window 120. "Show All People" option 128b may enable a network user to request that a listing of all network users that are logged-in to the network be listed in status window 120. "Show All People" option 128b may also provide a network user with the status of each person that is logged-in to the network (e.g., active, inactive). "Close" option 128c may be provided as a standard Windows™ option.

If a network user selects "Message" option 128a, system 10 may provide a separate message window 150 for communicating with one or more users via a text chat. Message window 150 may include a header 152, pull-down menus 154 (including "Message" option 154a and "Edit" option 154b, text body 156a, text body 156b, and various other known Windows™ options. Header 152 may be used to identify the network user(s) with whom a network user has established a text chat. Pull-down menu options 154a, 154b, may be used to perform various operations relating to the text chat. For example, "Message" option 154a may be used to establish a text chat communication with one or more network users and "Edit" option 154b may be used to, for example, "cut and paste" or delete text. Text body 156a enables network users to view text that is being received from the network users with whom that network user has established a text chat and text body 156b enables the network user to view the text that that network user has input.

Figure 6:
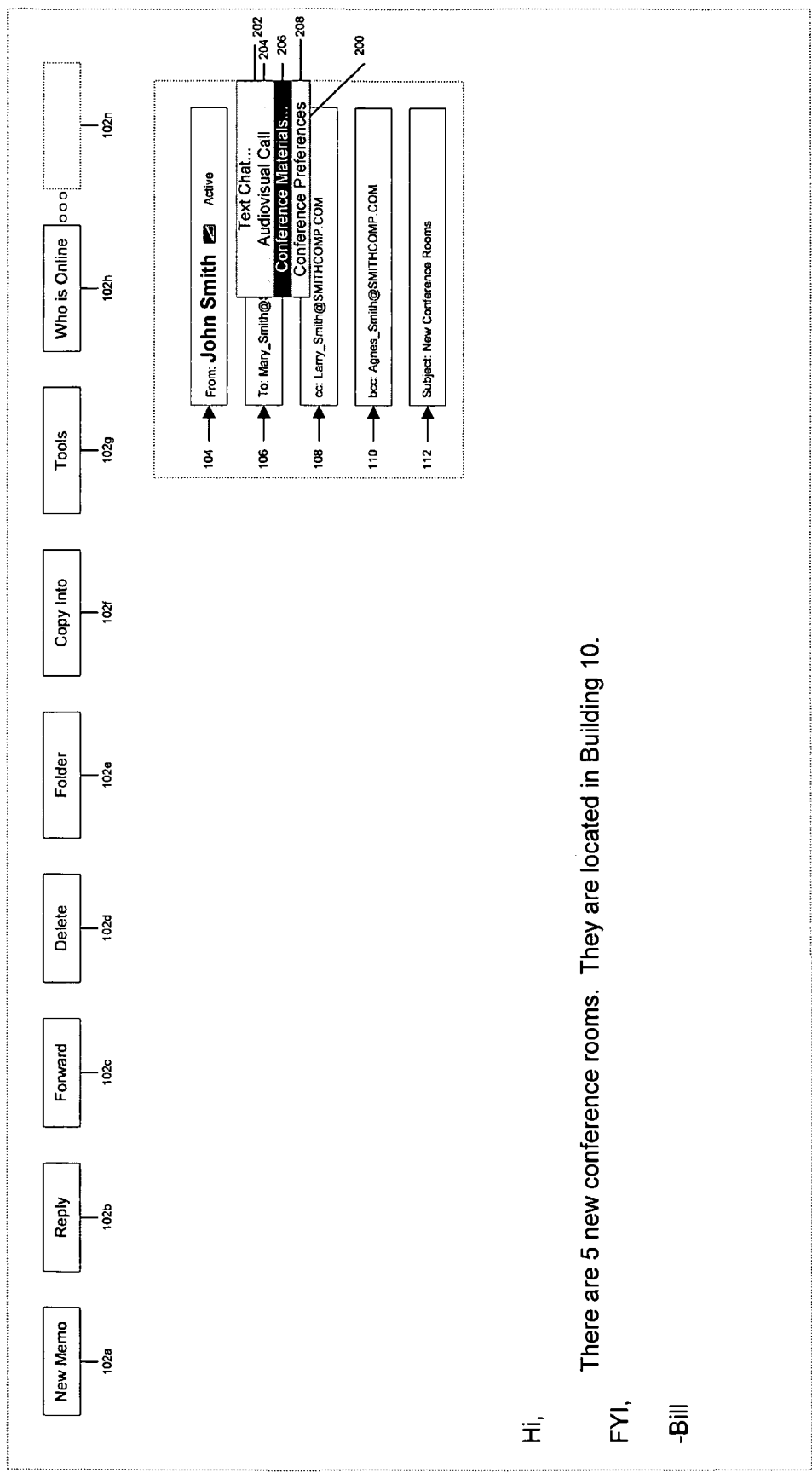
FIG. 6 is a schematic block diagram of a view of an electronic mail message illustrating various communications options in accordance with one embodiment of the present invention.

According to another embodiment, a network user may establish an audiovisual call, conference or other communication with one or more network users. A communication options window 200 in accordance with a preferred embodiment of the invention is shown in FIG. 6. Communications options window 200 comprises a text chat, audiovisual call, conference materials, and conference preferences options 202–208, respectively. As described above, text chat option 202 enables network users to establish a text chat communication with one or more network users. Audiovisual call option 204 enables network users to establish an audiovisual call with one or more network users. For example, a network user that selects audiovisual call option 204 may be presented with a window that displays a view of the network user(s) with whom that network user has established an audiovisual call. The view may be provided with various options relating to the communication. For example, the view may enable a network user to alter the volume, vary the characteristics of the display (e.g., brightness), etc.

Conference materials option 206 enables network users to conference multiple network users in one communication and perform various other operations (e.g., share one or more computer applications). For example, a network user may initiate a text chat with several network users to discuss changes to a document. It may benefit the network users to each be able to view the changes that are being suggested for the document. Therefore, system 10 enables users to share a word processing (or other) application so that each user may view the document using the same application and make changes that are reflected in each view of the document that is presented to the network users.

Conference preferences option 208 enables network users to set one or more preferences related to conferencing. For example, a network user may prefer not to be notified of incoming communications while participating in a conference communication. Therefore, system 10 enables network users to select a preference that suspends notification of incoming communications (e.g., electronic mail messages, text chats). Additionally, system 10 may enable a network user to set an "unavailable" option that notifies network users attempting to establish a communication with that network user that the network user is unavailable. For example, if a network user attempts to establish a communication with a network user who has set an "unavailable" option, that network user may receive a message stating "Do not disturb." Alternatively, if a user is unavailable, a code may be assigned that provides a visual indication that the network user is unavailable. For example, the user indicator of a network user that is unavailable may appear as gray text.

These and other preferences may also be presented and used in conjunction with other aspects of the invention. Various other conferencing options may be provided using known conferencing applications.

Figure 7:
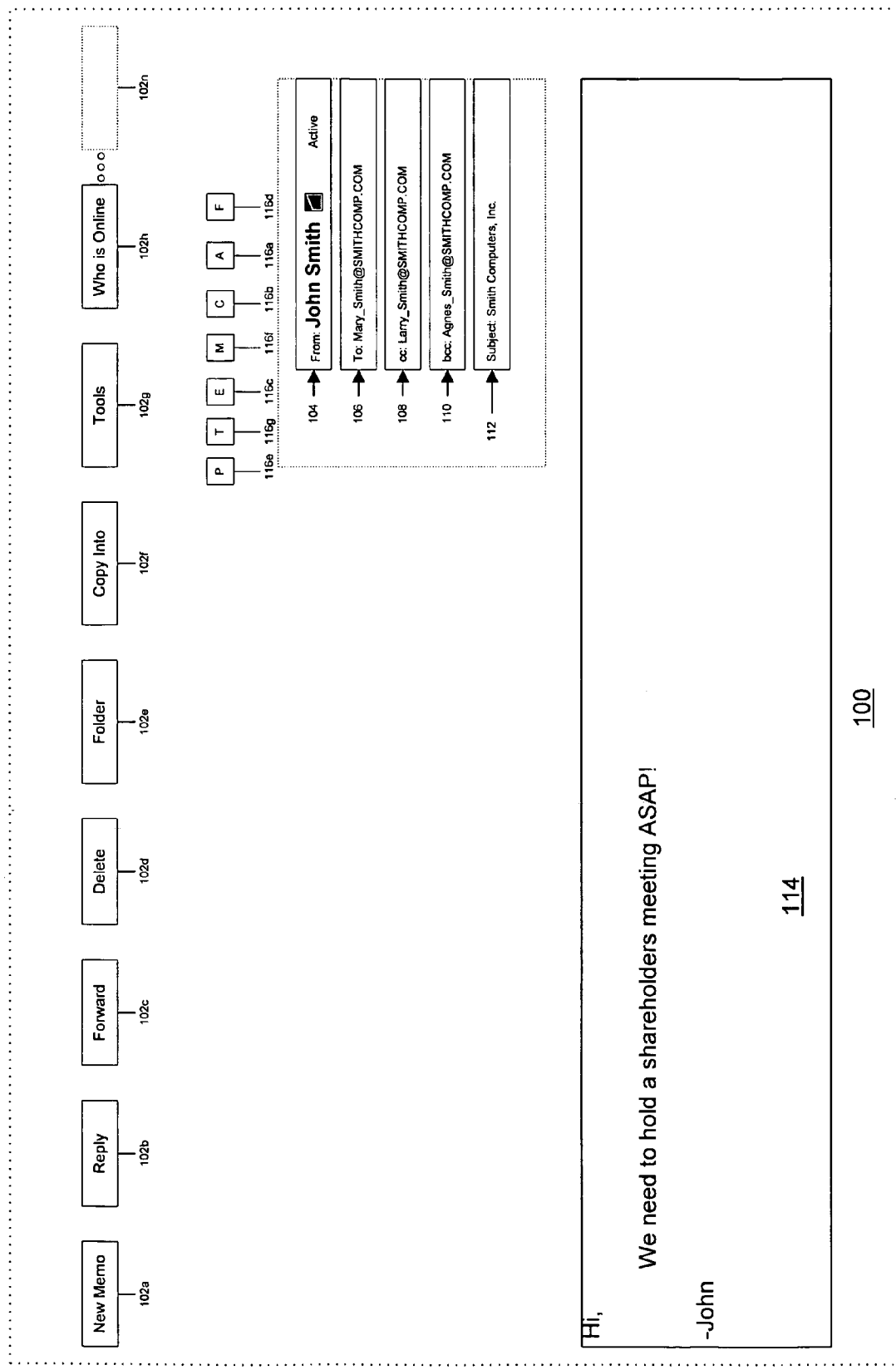
FIG. 7 is a schematic block diagram of a view of an electronic mail message illustrating various network user options in accordance with one embodiment of the present invention.

According to another embodiment of the invention, one or more communication option icons 116a–116n may be provided adjacent a user indicator as shown in FIG. 7. Communication option icons 116a–116n may be used to establish a communication with one or more network users. For example, communication option icons may comprise audio-visual call icon 116a, chat icon 116b, electronic mail message icon 116c, facsimile icon 116d, pager icon 116e, mobile phone icon 116f, and telephone icon 116g. A network user that desires to establish a communication with one or more network users may select a communication option icon 116a–116n and initiate a communication with that network user(s). For example, a network user may select communication option icon 116a adjacent a user indicator in "From" field 104. Selection of communication icon 116a establishes an audiovisual call with the network user associated with the communication option icon selected. Communication option icons may also be presented in a communication order preferred by the network user as described above.

It is to be understood that communication option icons 116a–116n may be provided for any user indicator provided in the electronic document and need not be provided adjacent a user indicator. For example, a single set of communication option icons may be provided in an electronic document and a user may select one or more network users and the communication option icon representing the communication desired to be established.

Further, the user's status associated with each of the communications may be reflected in the graphical user interface. For example, the icon may have a different color, highlighting, graying or other visual indicator to indicate whether the user is available for communication via that communication option presented. For example, if the user is on a mobile phone, away from his computer (and thus not active), but with his pager activated, the icon for the phone may be grayed out, the icon for electronic mail via the network may be green (to indicate on-line but not available), whereas the pager may be bold to indicate that the user's pager is on.

Figure 8:
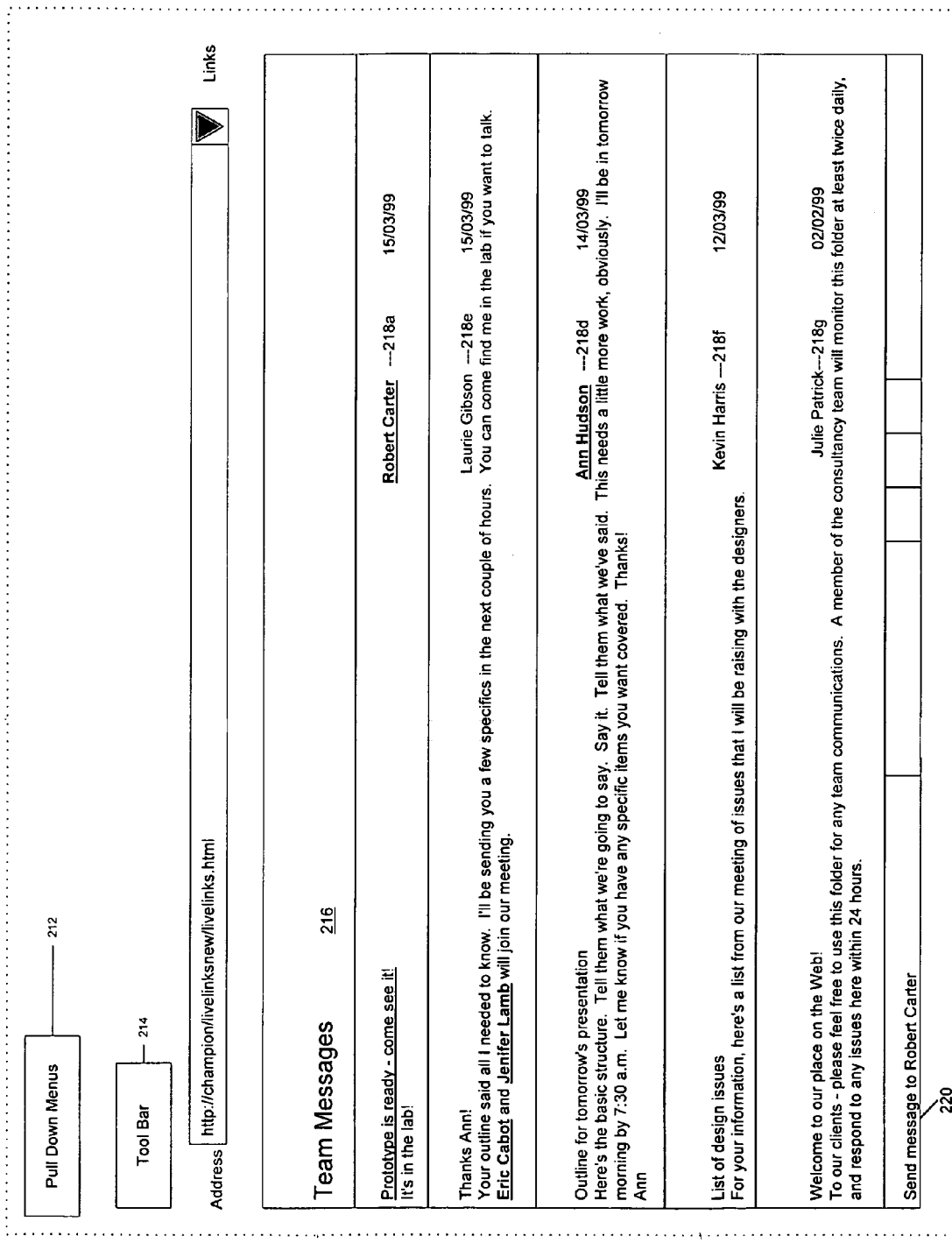
FIG. 8 is a schematic block diagram of a view of a HTML document having user indicators presented as links in accordance with one embodiment of the invention.

According to a specific embodiment of the present invention, hypertext mark-up language (HTML) documents are enabled to provide communication links to on-line users using user indicators as shown in FIG. 8. FIG. 8 is an illustration of a HTML document 210 provided with user indicators for network users listed in the message board. HTML document 210 may be provided in a browser interface along with standard browser features such as one or more pull-down menus 212 and toolbar 214. HTML document 210 may comprise body 216, user indicators 218a–218g, and link identifiers 220. In this embodiment, user indicators 218a–218g appearing in HTML document 210 are coded to provide a visual indication of a network user's status and to provide a link to one or more communication options. For example, body 216 may be provided with one or more user indicators 218a–218g. User indicators 218a–218g may be coded according to various criteria and be used as a communications link as described above. As shown in FIG. 8, user indicators 218a–218d are bold and underlined indicating that Robert Carter, Eric Cabot, Jennifer Lamb, and Ann Hudson, respectively, are all on-line. User indicators 218e–218g, however, are not bold and underlined, thus indicating that Laurie Gibson, Kevin Harris, and Julie Patrick, respectively, are not on-line. Other forms of indicating whether one or more users are on-line may also be used.

In order to provide user indicators 218a–218d as links in HTML document 210, the following code, for example, may be inserted into HTML document 210:

<LINK REL=STYLESHEET HREF="livelinks.css" TYPE="text/css>
<SCRIPT SRC="livelinksjs"></SCRIPT>

To represent a live link anywhere in the text of HTML document 210, the following code may be inserted:

<SCRIPT>writeLiveLink([User's login identification])</SCRIPT>

For example, to insert the name Jennifer Lamb at a certain position inside the document text, the following code may be inserted:

<SCRIPT>writeLiveLink("Jenifer Lamb")</SCRIPT>

In addition, a Java applet may be inserted on HTML document 210 that provides the status notifications and the communication establishing. The following code may be added to insert the applet:

<SCRIPT>
writeLiveLinksApplet([Applet URL], [Login Name], [Password])
<SCRIPT/>

Figure 9:
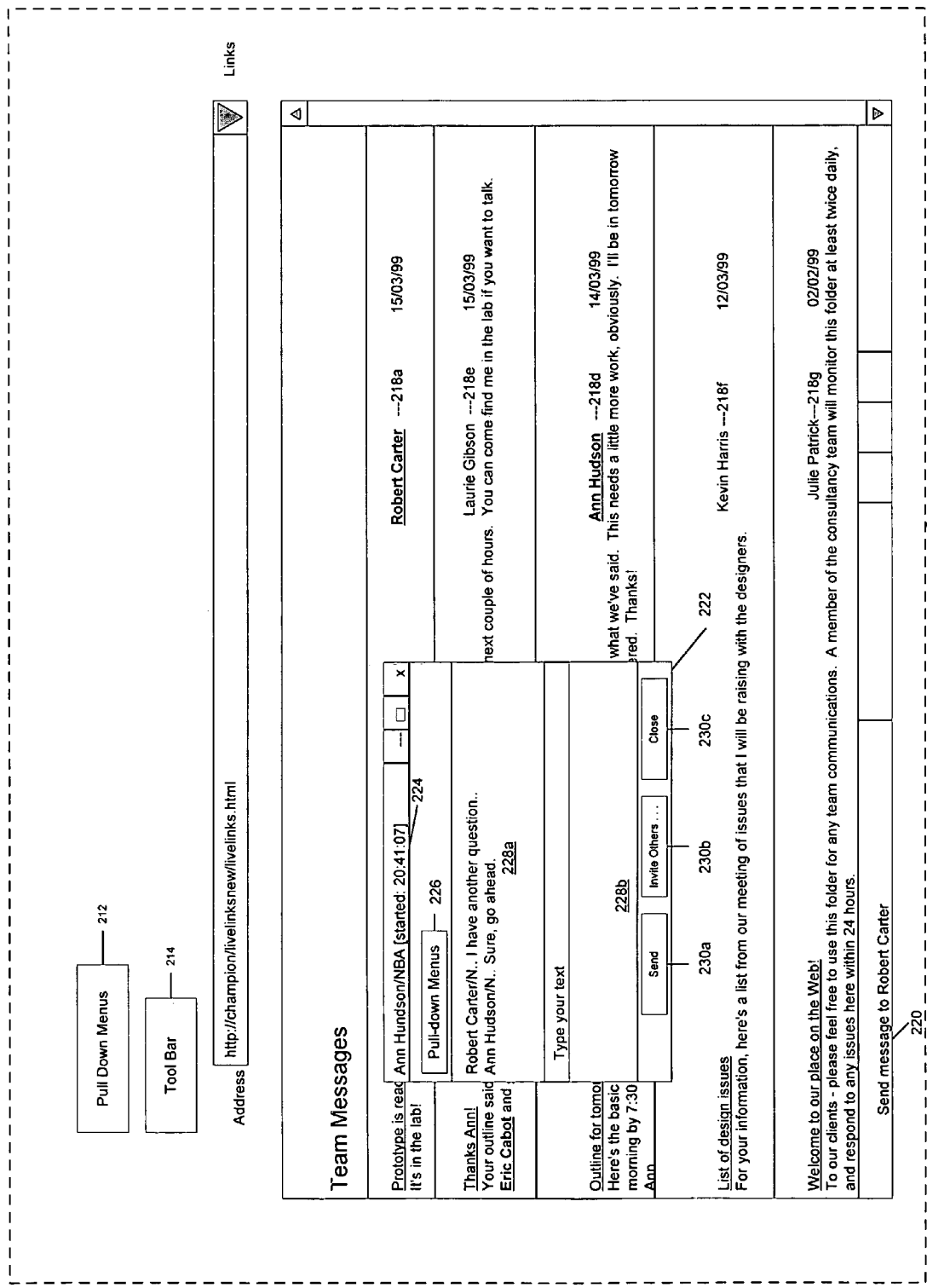
FIG. 9 is a schematic block diagram of a view of a communication initiated using a user indicator in a HTML document in accordance with one embodiment of the invention.

User indicators 218a–218d may be used to establish one or more communications with one or more network users. For example, FIG. 9 illustrates a text chat initiated using user indicator 218a. In this example, Ann Hudson has established a text chat with Robert Carter. A text chat (or other communication) may be initiated using any of the methods for establishing one or more communications as described above. After initiating a text chat, a text chat window 222 may be presented to the user.

Text chat window 222 may comprise a header 224, pull-down menus 226, text body 228a, text body 228b, and options 230a–230c. Header 224 may be used to identify the network user who initiated the text chat. Pull-down menus 226 may be used to present various operations relating to a text chat (as described above) or standard Windows™ operations. Text body 228a may be used to display the text input by each network user and text body 228b may be used to display text that is being input by that particular user prior to submitting the text to the text chat. Options 230a–230c may be used to perform various other operations. For example, option 230a may be used to send text input into text body 228b into the text chat. Option 230b may be used to establish text chat communications with other network users and option 230c may be used to close text chat window 222.

System 10 may be provided on a processor readable storage medium comprising processor readable code embodied therein and loaded onto a client. Various objects of the client may also be provided on a processor readable storage medium.

Other embodiments and uses of the invention will be apparent to those skilled in the art from consideration of the specification and practice of the invention disclosed herein. The specification and examples should be considered exemplary only. The scope of the invention is intended to be limited only by the following claims.

What is claimed is:

1. A system for enabling network users to determine a real-time status of one or more target network users and to establish communications with the one or more target network users using a user indicator that is presented using two or more types of applications, the system comprising:

user indicator presentation means for enabling presentation of at least one user indicator within two or more types of electronic documents, wherein the electronic document types are capable of being generated using the two or more types of applications and wherein each user indicator is associated with the one or more target network users;

status presenting means for presenting status indicators associated with corresponding user indicators to provide the real-time status of the one or more target network users; and communication means for enabling the network users to initiate communications with the one or more target network users upon selection of the desired user indicator.

2. The system of claim 1, further comprising preference presentation means for presenting the network users preference for receiving communications.

3. The system of claim 1, further comprising updating means for updating the real-time status of the one or more target network users.

4. The system of claim 1, further comprising conference communication means for enabling the network users to establish conference communications with the one or more target network users.

5. The system of claim 4, wherein the conference communication means enable the network users to share at least one application.

6. A method for enabling network users to determine a real-time status of one or more target network users and to establish communications with the one or more target network users using a user indicator, the system comprising the steps of:

generating two or more types of electronic documents using two or more types of applications;

presenting one or more user indicators within the two or more types of electronic documents, each user indicator being associated with at least one network user;

presenting the real-time status of the one or more target network users associated with the one or more user indicators via the two or more types of applications, the real-time status including an availability of the one or more target network users to engage in a communication; and establishing a communication link with the one or more target network users based on the indicated availability of the one or more target network users.

7. The method of claim 6, further comprising the step of enabling the one or more target network users to establish one or more communication preferences.

8. The method of claim 6, further comprising the step of updating the real-time status of the one or more target network users.

9. The method of claim 6, further comprising the step of enabling the network users to share at least one application.

10. A system for enabling network users to determine a real-time status of one or more target network users and to establish communications with the one or more target network users using a user indicator, the system comprising:

a user indicator presentation module for presenting at least one user indicator within two or more types of electronic documents, wherein the electronic document types are capable of being generated using two or more types of applications and wherein each user indicator is associated with at least one target network user;

a status determining module that determines the real-time status of the one or more target network users including an availability of the one or more target network users to engage in a communication; and a communication module that establishes a communication link with the one or more target network users based on the determined availability of the one or more target network users presented by the two or more types of applications.

11. The system of claim 10, further comprising a communication options preference presentation module that presents the network users preference for receiving communications.

12. The system of claim 10, further comprising a status updating module that updates the real-time status of the one or more target network users.

13. The system of claim 10, further comprising a conference communication module that enables the network users to establish conference communications with the one or more target network users.

14. The system of claim 13, wherein the conference communication module enables the network users to share at least one application.

15. A processor readable medium having processor readable code embodied therein for enabling at least one network user to obtain a real-time status of one or more target network users and establish a communication link using the real-time status of one or more target network users comprising:

processor readable code that causes a processor to enable the at least one network user to generate two or more types of electronic documents using two or more types of applications;

processor readable code that causes the processor to present at least one user indicator within the two or more types of electronic documents, each user indicator being associated with the one or more target network users;

processor readable code that causes the processor to provide the real-time status of the one or more target network users including an availability of the one or more target network users to engage in a communication; and processor readable code that causes the processor to establish a communication link with the one or more target network users, based on the indicated availability of the one or more target network users presented by the two or more types of applications.

16. The medium of claim 15, further comprising processor readable code that causes the processor to present a preference of the at least one network user to receive communications.

17. The medium of claim 16, further comprising processor readable code that causes the processor to enable the one or more target network users to prioritize the preferences.

18. The medium of claim 15, further comprising processor readable program code that causes the processor to update the real-time status of the one or more target network users.

19. The medium of claim 15, further comprising processor readable code that causes the processor to enable the at least one network user to establish conference communications with the one or more target network users.

20. The medium of claim 15, wherein the processor readable code enables the at least one network user to share at least one application upon establishing conference communications.

21. A system for enabling network users to determine a real-time status of one or more target network users and to establish communications with the one or more target network users using a user indicator, the system comprising:
   a user indicator presentation module associated with a first type of application for presenting at least one user indicator within two or more types of electronic documents, wherein the electronic document types are capable of being generated using two or more types of applications and wherein each user indicator is associated with at least one target network user;
   a status determining module associated with a second type of application that determines the real-time status of the one or more target network users including an availability of the one or more target network users to engage in a communication, wherein the first application type and the second application type are different application types; and
   a communication module that establishes a communication link with the one or more target network users based on the determined availability of the one or more target network users presented by the two or more types of applications.

22. A system for enabling network users to determine a real-time status of one or more target network users and to establish communications with the one or more target network users using a user indicator, the system comprising:
   a user indicator presentation module for presenting at least one user indicator within two or more types of electronic documents, wherein electronic document types are capable of being generated using two or more types of non-HTML applications, each user indicator being associated with at least one target network user;
   a status determining module that determines the real-time status of the one or more target network users including an availability of the one or more target network users to engage in a communication; and
   a communication module that establishes a communication link with the one or more target network users based on the determined availability of the one or more target network users presented by the two or more types of non-HTML applications.

23. A system for enabling network users to determine a real-time status of a plurality of target network users and to establish communications with one or more of the plurality of target network users using two or more user indicators presented in two or more types of documents generated by two or more types of applications, the system comprising:
   a user directory that includes user information that corresponds to the plurality of target network users, wherein the user information includes user indicators;
   documents generated by the two or more types of applications, wherein each document includes at least two user depictions associated with at least two target network users;
   an identification determining module that references the user directory to access at least two user indicators that correspond to the at least two target network users associated with the at least two user depictions included in the documents;
   a user indicator presentation module that presents the at least two user indicators within the documents, wherein the user indicator presentation module is capable of presenting the at least two user indicators within the two or more types of electronic documents that are capable of being generated using the two or more types of applications;
   a status determining module that determines real-time statuses of the at least two target network users including an availability of the at least two target network users to engage in a communication; and
   a communication module that establishes a communication link with one or more of the at least two target network users based on the determined availability of the at least two target network users presented by the two or more types of applications.

* * * * *